US010136187B2

United States Patent
Hampson et al.

(10) Patent No.: US 10,136,187 B2
(45) Date of Patent: *Nov. 20, 2018

(54) METHODS, SYSTEMS, AND MEDIA FOR PRESENTING A SUGGESTION TO WATCH VIDEOS

(71) Applicant: Google LLC, Mountain View, CA (US)

(72) Inventors: Courtney Hampson, Mountain View, CA (US); Jason Robert Richard Sanio, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/599,958

(22) Filed: May 19, 2017

(65) Prior Publication Data
US 2017/0257672 A1   Sep. 7, 2017

Related U.S. Application Data

(63) Continuation of application No. 14/619,941, filed on Feb. 11, 2015, now Pat. No. 9,661,386.

(51) Int. Cl.
H04N 21/458       (2011.01)
H04N 21/442       (2011.01)
(Continued)

(52) U.S. Cl.
CPC ........... *H04N 21/458* (2013.01); *G06Q 10/10* (2013.01); *G06Q 10/109* (2013.01); *H04L 29/06* (2013.01);
(Continued)

(58) Field of Classification Search
CPC ........... H04N 21/458; H04N 21/44222; H04N 21/4667; H04N 21/4882; H04N 21/858
(Continued)

(56) References Cited

U.S. PATENT DOCUMENTS

2009/0030774 A1 *  1/2009  Rothschild ............. G06Q 30/02
                                                        705/14.1
2009/0124241 A1    5/2009  Krishnaswamy et al.
(Continued)

FOREIGN PATENT DOCUMENTS

WO   WO/2013/162464    10/2013

OTHER PUBLICATIONS

International Preliminary Report on Patentability dated Aug. 15, 2017 in International Patent Application No. PCT/US2016/012170.
(Continued)

*Primary Examiner* — Jivka A Rabovianski
(74) *Attorney, Agent, or Firm* — Byrne Poh LLP (57) ABSTRACT

Methods, systems, and media for presenting a suggestion to watch videos are provided. In accordance with some embodiments, a method for presenting a suggestion to watch videos is provided, the method comprising: receiving, from a user device, a message that includes a link to a video; determining whether the link has been selected; in response to determining that the link has not been selected, determining a probability value that indicates a likelihood that a user associated with the user device would be interested in viewing the video; in response to determining that the probability value is greater than a predetermined threshold value, determining a time to suggest that the user view the video based at least in part on information relating to movement of the user device; and causing a suggestion to view the video to be presented in a suggestion interface on the user device at the determined time.

18 Claims, 5 Drawing Sheets

(51) Int. Cl.
| | |
|---|---|
| *H04N 21/488* | (2011.01) |
| *H04N 21/466* | (2011.01) |
| *H04N 21/858* | (2011.01) |
| *G06Q 10/10* | (2012.01) |
| *H04L 29/06* | (2006.01) |
| *H04L 29/08* | (2006.01) |
| *H04W 4/02* | (2018.01) |

(52) U.S. Cl.
CPC ............ *H04L 67/22* (2013.01); *H04L 67/306* (2013.01); *H04L 67/325* (2013.01); *H04N 21/44222* (2013.01); *H04N 21/4667* (2013.01); *H04N 21/4882* (2013.01); *H04N 21/858* (2013.01); *H04W 4/02* (2013.01)

(58) Field of Classification Search
USPC ....................................................... 725/14, 9
See application file for complete search history.

(56) References Cited

U.S. PATENT DOCUMENTS

| | | | |
|---|---|---|---|
| 2009/0157512 A1* | 6/2009 | King | ...................... G06Q 10/10 705/14.27 |
| 2009/0267909 A1 | 10/2009 | Chen et al. | |
| 2010/0070372 A1 | 3/2010 | Wafa et al. | |
| 2013/0174045 A1 | 7/2013 | Sarukkai et al. | |
| 2014/0032718 A1 | 1/2014 | Berger et al. | |

OTHER PUBLICATIONS

Notice of Allowance dated Jan. 20, 2017 in U.S. Appl. No. 14/619,941.
International Search Report & Written Opinion of the International Search Authority dated Apr. 4, 2016 in International Patent Application No. PCT/US2016/012170.
Office Action dated Feb. 26, 2016 in U.S. Appl. No. 14/619,941.
Office Action dated Aug. 18, 2016 in U.S. Appl. No. 14/619,941.

* cited by examiner

METHODS, SYSTEMS, AND MEDIA FOR PRESENTING A SUGGESTION TO WATCH VIDEOS

CROSS-REFERENCE TO RELATED APPLICATION

This application is a continuation of U.S. patent application Ser. No. 14/619,941, filed Feb. 11, 2015, which is hereby incorporated by reference herein in its entirety.

TECHNICAL FIELD

The disclosed subject matter relates to methods, systems, and media for presenting a suggestion to watch videos.

BACKGROUND

People often receive links to videos from their friends, for example, in text messages, e-mails, or instant message chats. In some instances, the time when the message is received might not be a good time to watch the video. However, it can be difficult to remember to watch the video at a more convenient time.

Accordingly, it is desirable to provide new methods, systems, and media for presenting a suggestion to watch videos.

SUMMARY

Methods, systems, and media for presenting a suggestion to watch videos are provided.

In accordance with some embodiments of the disclosed subject matter, a method for presenting a suggestion to watch videos is provided, the method comprising: receiving, on a user device, a message in a communication interface that includes a link to a video; determining whether the link to the video has been selected; in response to determining that the link to the video has not been selected, determining, using a hardware processor, a probability value that indicates a likelihood that a user associated with the user device would be interested in viewing the video; in response to determining that the probability value is greater than a predetermined threshold value, determining a time to suggest that the user view the video based at least in part on information relating to movement of the user device; and causing a suggestion to view the video to be presented in a suggestion interface on the user device at the determined time.

In accordance with some embodiments of the disclosed subject matter, a system for presenting a suggestion to watch videos is provided, the system comprising: a hardware processor that is programmed to: receive, on a user device, a message in a communication interface that includes a link to a video; determine whether the link to the video has been selected; in response to determining that the link to the video has not been selected, determine a probability value that indicates a likelihood that a user associated with the user device would be interested in viewing the video; in response to determining that the probability value is greater than a predetermined threshold value, determine a time to suggest that the user view the video based at least in part on information relating to movement of the user device; and cause a suggestion to view the video to be presented in a suggestion interface on the user device at the determined time.

In accordance with some embodiments of the disclosed subject matter, a non-transitory computer-readable medium containing computer-executable instructions that, when executed by a processor, cause the processor to perform a method for presenting a suggestion to watch videos, is provided. The method comprises: receiving, on a user device, a message in a communication interface that includes a link to a video; determining whether the link to the video has been selected; in response to determining that the link to the video has not been selected, determining a probability value that indicates a likelihood that a user associated with the user device would be interested in viewing the video; in response to determining that the probability value is greater than a predetermined threshold value, determining a time to suggest that the user view the video based at least in part on information relating to movement of the user device; and causing a suggestion to view the video to be presented in a suggestion interface on the user device at the determined time.

In accordance with some embodiments of the disclosed subject matter, a system for presenting a suggestion to watch videos is provided, the system comprising: means for receiving, on a user device, a message in a communication interface that includes a link to a video; means for determining whether the link to the video has been selected; in response to determining that the link to the video has not been selected, means for determining a probability value that indicates a likelihood that a user associated with the user device would be interested in viewing the video; in response to determining that the probability value is greater than a predetermined threshold value, means for determining a time to suggest that the user view the video based at least in part on information relating to movement of the user device; and means for causing a suggestion to view the video to be presented in a suggestion interface on the user device at the determined time.

In some embodiments, the means for determining whether the link to the video has been selected further comprises means for determining that the link has not been selected within a predetermined period of time.

In some embodiments, the means for determining whether the link to the video has been selected further comprises means for determining that the message has been closed within a predetermined period of time.

In some embodiments, the suggestion interface includes an indication that a queue of a plurality of videos including the video associated with the link has been created.

In some embodiments, the system further comprises means for determining a type of suggestion interface based on the probability value.

In some embodiments, the system further comprises means for receiving information indicating that the user watched a second video related to the video, wherein determining the probability value is based at least in part on the received information.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for presenting a suggestion to watch videos are provided.

In some embodiments, the mechanisms described herein can receive, on a user device, a message that includes a link to a video. The mechanisms can then determine whether or not the link was selected, for example, within a particular period of time. If it is determined that the link was not selected, the mechanisms can determine a probability that a user associated with the user device is likely to be interested in viewing the video, and, if the probability value exceeds a threshold value, can determine a time indicative of when the user is likely to be interested in viewing the video. The mechanisms can then cause a suggestion interface to be presented, which can include a suggestion to view the video associated with the link.

In some embodiments, the suggestion interface can include a text message, a user interface that includes the suggestion to view the video along with other information (e.g., current weather and/or traffic conditions), and/or an indication that the video has been added to a queue of videos for the user to watch. In some embodiments, the type of suggestion interface used can be determined based on the probability that the user is likely to be interested in viewing the video. For example, in instances where the probability is greater than a predetermined threshold value, the suggestion interface can include a relatively intrusive type of message, such as a text message. Alternatively, in instances where the probability is less than the predetermined threshold value, the suggestion interface can include a relatively non-intrusive type of message, such as a notification and/or an email message.

In some embodiments, the mechanisms can determine the probability that the user is interested in viewing the video and a time the user is likely to be interested in viewing the video based on multiple sources of information. For example, in some embodiments, the mechanisms can determine the probability that the user is interested in viewing the video based on whether the user has already watched the video, whether the user has watched videos related to the video, whether the video is popular (e.g., has been watched more than a particular number of times), and/or any other suitable information. As another example, in some embodiments, the mechanisms can determine the time the user is likely to be interested in viewing the video based on the user's current activities (e.g., whether the user is in a meeting, whether the user is in a noisy environment, whether the user is currently moving, and/or any other suitable current activities), times the user has chosen to watch videos in the past, and/or any other suitable information.

In some embodiments, a user can affirmatively provide consent for particular types of information to be used. For example, in some embodiments, a user can provide consent to retrieve information from particular sources (e.g., social networking services, a user account associated with a video hosting service, the user's e-mail account, movement activity associated with a user device, location information from a user device, and/or any other suitable source of information) to be used to determine the probability that the user is interested in viewing the video and/or to determine a time the user is likely to view the video. In some embodiments, the user can select and/or deselect particular sources of information at any suitable time.

Figure 1:
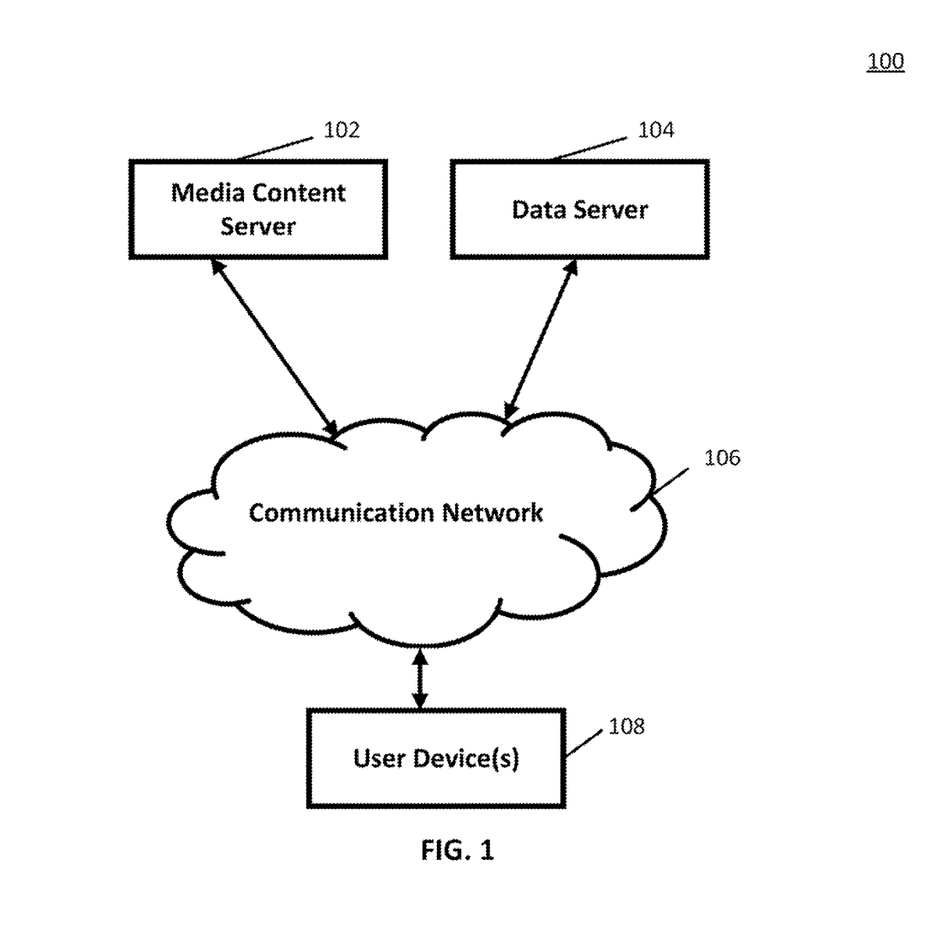
FIG. 1 shows a schematic diagram of an example of a system for presenting a suggestion to watch videos in accordance with some embodiments of the disclosed subject matter.

Turning to FIG. 1, an example 100 of hardware for presenting a suggestion to watch a video that can be used in accordance with some embodiments of the disclosed subject matter is shown. As illustrated, hardware 100 can include one or more servers, such as a media content server 102, a data server 104, a communication network 106, and one or more user devices 108.

Media content server 102 can be any suitable server for storing media content and delivering the media content to a user device 108 in some embodiments. For example, media content server 102 can be a server that streams media content to user device 108 via communication network 106. As a more particular example, in some embodiments, media content server 102 can stream media content to user device 108 in response to receiving a request for the media content from user device 108. Content provided by media content server 102 can be any suitable content, such as video content, audio content, television programs, movies, cartoons, sound effects, audiobooks, streaming live content (e.g., a streaming radio show, a live concert, and/or any other suitable type of streaming live content), electronic books, search results and/or any other suitable type of content. Content can be created and uploaded to media content server 102 by any suitable entity.

Data server 104 can be any suitable server for storing information related to a user's preferences for viewing content, information related to content a user has previously watched, and/or any other suitable information. In some embodiments, data server 104 can transmit, to a user device, information related to videos the user has previously watched, as described below in connection with FIG. 3. For example, in some embodiments, data server 104 can transmit information indicating that the video associated with the link has already been viewed from a user account associated with the user device. As another example, in some embodiments, data server 104 can transmit information indicating that a video similar to the video associated with the link (e.g., based on metadata associated with the two videos, based on identities of the creators of the two videos, based on common viewers of the two videos, and/or based on any other suitable information) has been viewed from a user account associated with the user device. Note that, in some embodiments, authorization can be requested from a user before information relating to the user's preferences and/or video viewing habits is stored on data server 104.

Communication network 106 can be any suitable combination of one or more wired and/or wireless networks in some embodiments. For example, communication network 106 can include any one or more of the Internet, a mobile data network, a satellite network, a local area network, a wide area network, a telephone network, a cable television network, a WiFi network, a WiMax network, and/or any other suitable communication network.

User device(s) 108 can include any one or more user devices suitable for receiving messages and/or presenting content. For example, in some embodiments, user device(s) 108 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some embodiments, user device(s) 108 can include non-mobile devices such as a desktop computer, a set-top box, a television, a streaming media player, a game console, or any other suitable non-mobile device.

Although media content server 102 and data server 104 are illustrated as separate devices, any one or more of these devices can be combined into one device in some embodiments. Also, although only one each of media content server 102 and data server 104 are shown in FIG. 1 to avoid over-complicating the figure, any suitable one or more of each device can be used in some embodiments.

Although only one user device 108 is shown in FIG. 1 to avoid over-complicating the figure, any suitable number of each of these devices, and any suitable types of these devices, can be used in some embodiments.

Media content server 102, data server 104, and user device 108 can be implemented using any suitable hardware in some embodiments. For example, in some embodiments, devices 102, 104, and 108 can be implemented using any suitable general purpose computer or special purpose computer. For example, a server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Figure 2:
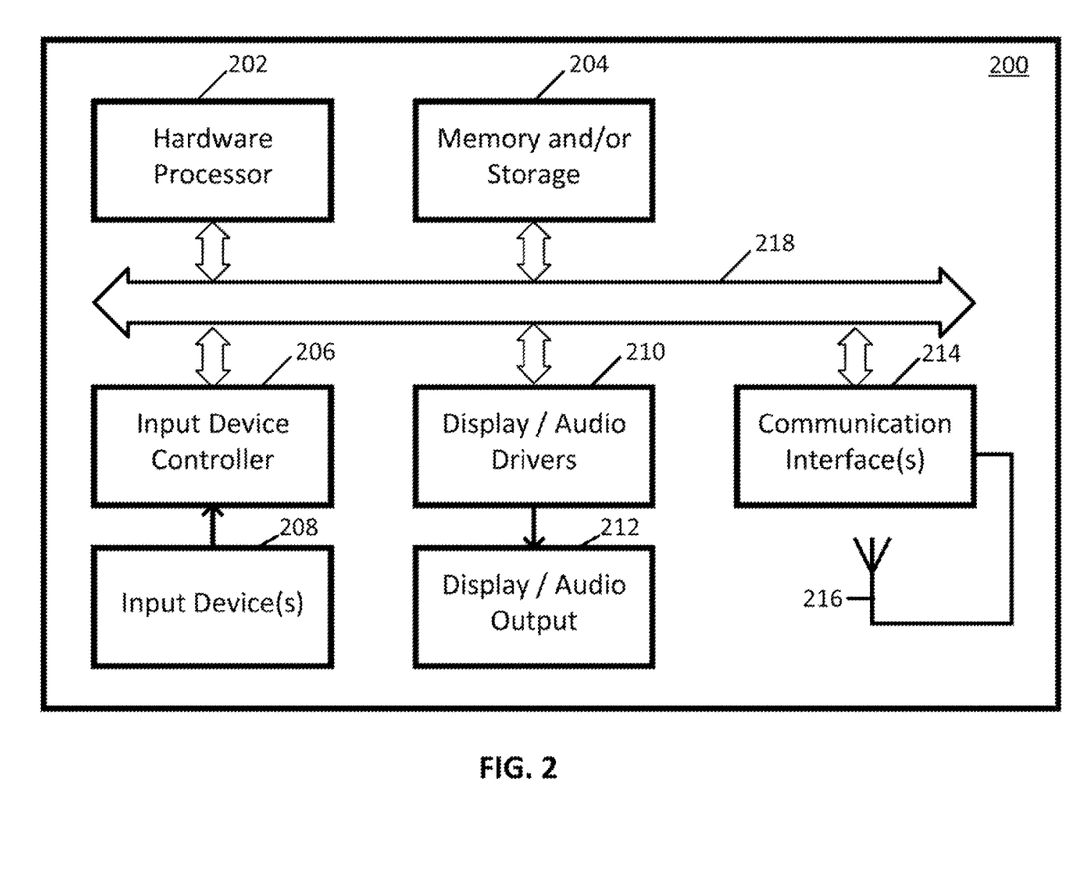
FIG. 2 shows an example of hardware that can be used in a server and/or a user device in accordance with some embodiments of the disclosed subject matter.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 106 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Figure 3:
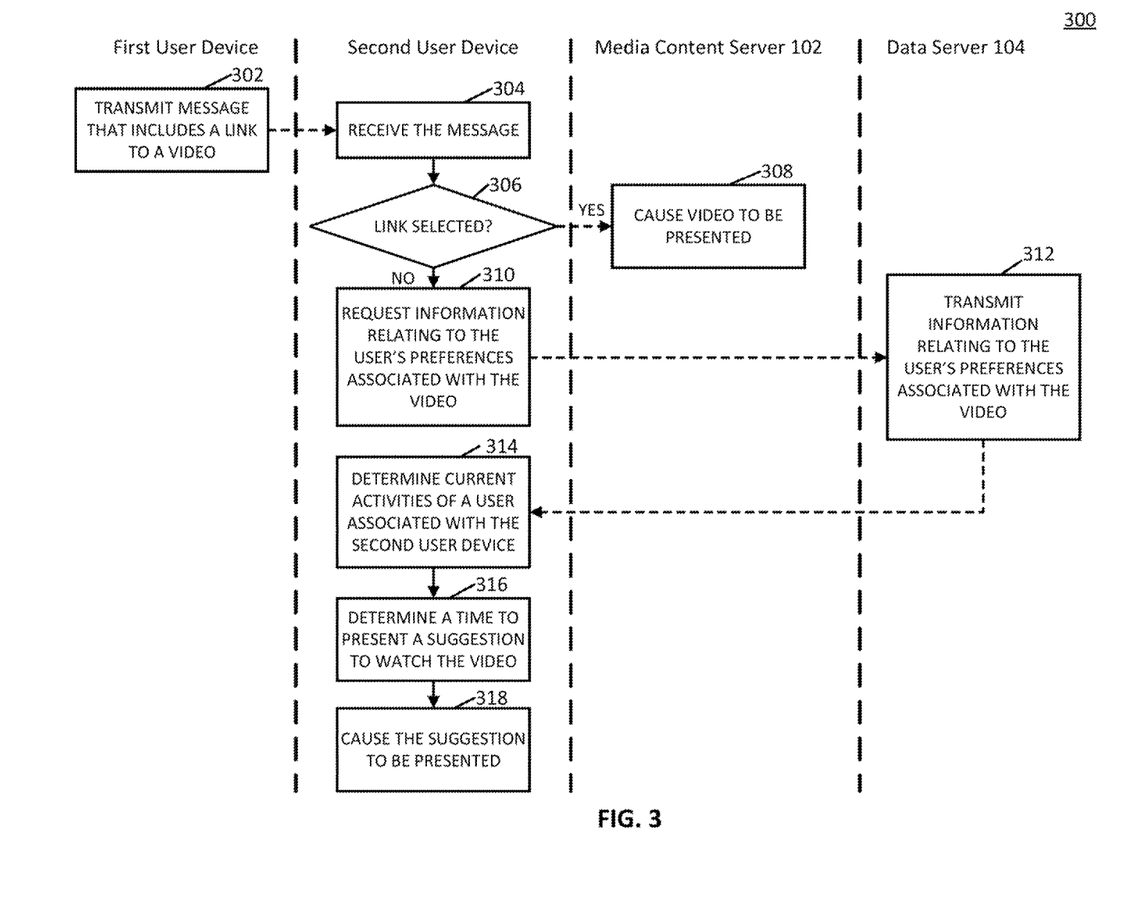
FIG. 3 shows an example of an information flow diagram for presenting a suggestion to watch videos in accordance with some embodiments of the disclosed subject matter.

Turning to FIG. 3, an example 300 of an information flow diagram for presenting a suggestion to watch videos is shown in accordance with some embodiments of the disclosed subject matter. As illustrated, blocks of information flow diagram 300 can be implemented on a first user device, a second user device, media content server 102, and/or data server 104.

At 302, the first user device can transmit a message that includes a link to a video. In some embodiments, the message can include any suitable type of communication, such as a text message, an e-mail, a chat and/or instant message, a comment on a post on a social networking site, and/or any other suitable type of message. In some embodiments, the message can include any other suitable content, such as text, images, icons, graphics, animations, and/or any other suitable content. Note that, although the message is described as including a link to a video, in some embodiments, the link can be to any suitable content, such as audio content, a television program, an e-book, a web site, and/or any other suitable content.

At 304, the second user device can receive the message. In some embodiments, the message can be displayed by the second user device upon receipt. Alternatively, in some embodiments, the second user device can cause a notification of the received message to be presented, and can cause the message to be presented in response to determining that an indication to present the message has been received (e.g., by determining that the notification has been selected, by determining that an application associated with a particular type of message has been selected, and/or based on any other suitable type of indication).

At 306, the second user device can determine whether the link in the received message has been selected. In some embodiments, the second user device can use any suitable technique(s), such as those described below in connection with block 404 of FIG. 4 to determine whether the link has been selected.

If, at 306, it is determined that the link has been selected, the associated video can be presented. In instances where the link is associated with media content server 102, media content server 102 can cause the video to be presented at 308, for example, by streaming the video to the second user device via communication network 106.

If, at 306, it is determined that the link has not been selected, the second user device can request information relating to a user of the second user device's preferences associated with the video at 310. For example, in some embodiments, the second user device can request the information from data server 104. As a more particular example, in some embodiments, the requested information can include whether the user has previously watched the video associated with the link. As another more particular example, in some embodiments, the requested information can include whether the user has previously watched a different video created by the creator of the video associated with the link. As yet another more particular example, in some embodiments, the requested information can include whether the user has watched a different video within a category (e.g., a topic, a genre, a channel, and/or any other suitable type of category) associated with the video associated with the link. As still another more particular example, in some embodiments, the requested information can include whether the user has watched a different video associated with metadata that is related to the video associated with the link, and/or any other suitable information. In some embodiments, the second user device can additionally transmit an identifier of a user account associated with the second user device and/or a service used to view the video associated with the link.

At 312, data server 104 can transmit information relating to the user's preferences and the video associated with the link to the second user device. In some embodiments, data server 104 can access information associated with a particular user account (e.g., based on an identifier of the user account transmitted by the second user device) to access the requested information.

At 314, the second user device can determine information related to a current activity associated with a user of the second user device and/or information related to future activities associated with a user of the second user device. For example, in some embodiments, the second user device can determine a current location and/or a current activity of the user based on information in a calendar entry (e.g., to determine that the user is currently in a meeting, that the user is currently at a movie, and/or any other suitable information). As another example, in some embodiments, the second user device can determine a current location of the second user device using a global positioning system (GPS) signal associated with the second user device. As yet another example, in some embodiments, the second user device can determine that the user is currently moving (e.g., in a vehicle, walking, etc.) based on movement data (e.g., from GPS data, from an accelerometer, and/or from any other suitable signal) associated with the second user device. As still another example, in some embodiments, the second user device can determine that the user is likely to be at a particular location (e.g., a restaurant, a movie, etc.) based on an audio recording (e.g., recorded from a microphone associated with the second user device). As still another example, in some embodiments, the second user device can determine that the user will be at a particular location and/or event at a particular time in the future based on information in a calendar entry.

In some embodiments, the information related to a current and/or future activity can be determined based on the user's activities on particular web sites. For example, in some embodiments, a current and/or future activity can be determined by parsing text posted by the user to a social networking site. As another example, in some embodiments, the current activity can be determined based on activity within a web site that provides e-mail services. As a specific example, in some embodiments, it can be determined that the user is checking and/or sending e-mail from a personal e-mail account. As yet another example, in some embodiments, the current activity can include that the second user device has a particular web site open. As a specific example, in some embodiments, it can be determined that the particular web site is related to a particular topic (e.g., a topic related to the video, a topic not related to the user's work, and/or any other suitable topic).

At 316, the second user device can determine a time to present a suggestion to watch the video. In some embodiments, the time can be determined based on a calculated probability that the user is likely to want to watch the video at that particular time. In some embodiments, the time can be a time in the future (e.g., in 4 hours, at 7 p.m. this evening, and/or any other suitable time in the future). Alternatively, in some embodiments, the second user device can determine that the user is likely to be interested in watching the video at the current time. In some embodiments, the second user device can determine the time based on the current and future activities of the user, as described above. As a specific example, in some embodiments, the determined time can include a time the user is determined to not be in a meeting. As another specific example, in some embodiments, the determined time can include a time the user is determined to be checking and/or sending e-mail from a personal e-mail account. As yet another specific example, in some embodiments, the determined time can include a time the user is determined to be browsing a web site related to a topic determined to not be work-related. In some embodiments, the second user device can use any suitable technique(s) and any other suitable information to determine the time, as described below in connection with block 414 of FIG. 4.

At 318, the second user device can cause the suggestion to be presented. In some embodiments, the suggestion can be presented using a type of user interface selected by the second user device, as described below in connection with block 416 of FIG. 4. For example, in some embodiments, the suggestion can be presented as text message. As another example, in some embodiments, the suggestion can be presented within a user interface that can contain other information (e.g., current weather, current traffic conditions, and/or any other suitable information). As yet another example, in some embodiments, the suggestion can be presented as an indication that a queue of videos to watch has been created in association with a particular user account and/or a particular video streaming service. In some such embodiments, selection of the suggestion and/or the suggestion interface can cause videos in the queue (e.g., a first video in the queue) to begin playback. In some embodiments, the second user device can determine the suggestion modality and/or the type of user interface based on a determination of how likely the user is to be interested in viewing the video, as described below in connection with block 416 of FIG. 4.

Figure 4:
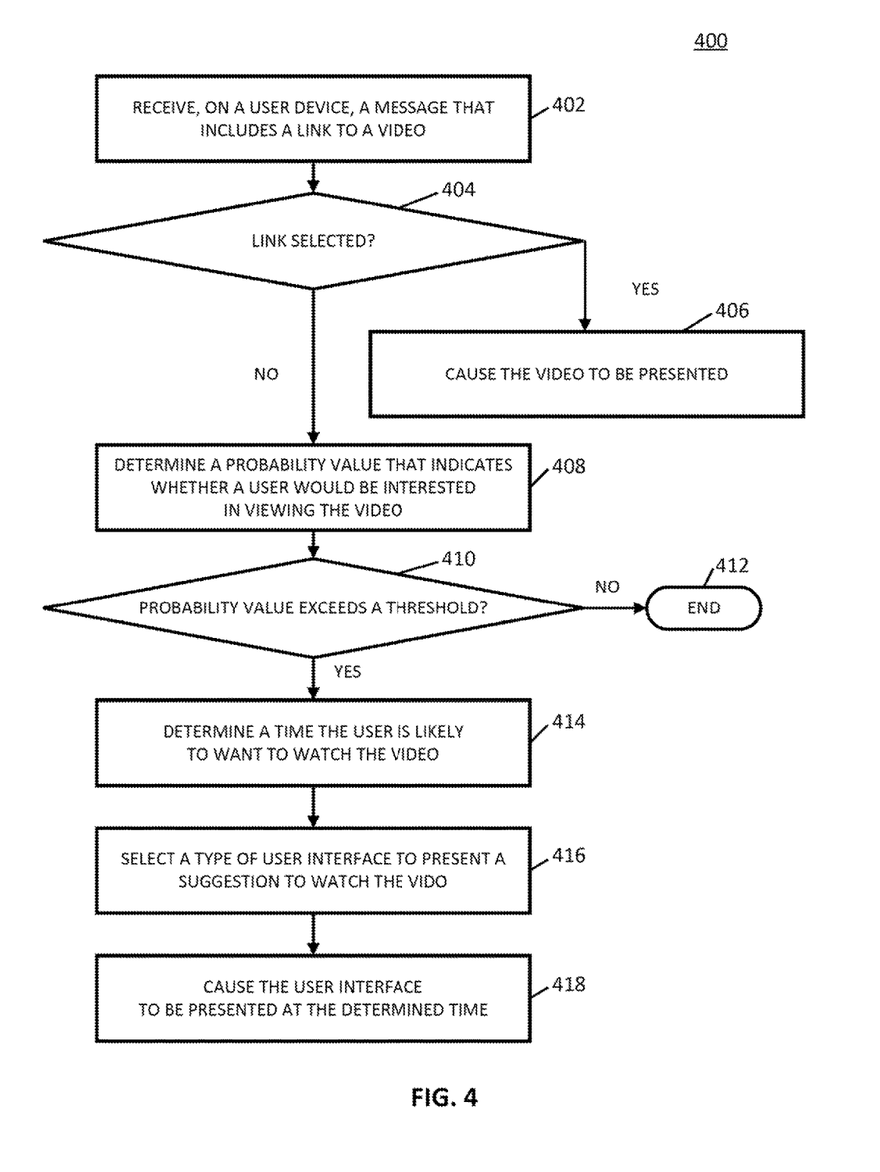
FIG. 4 shows an example of a process for presenting a suggestion to watch videos in accordance with some embodiments of the disclosed subject matter.

Turning to FIG. 4, an example 400 of a process for presenting a suggestion to watch videos is shown in accordance with some embodiments of the disclosed subject matter.

Figure 5A:
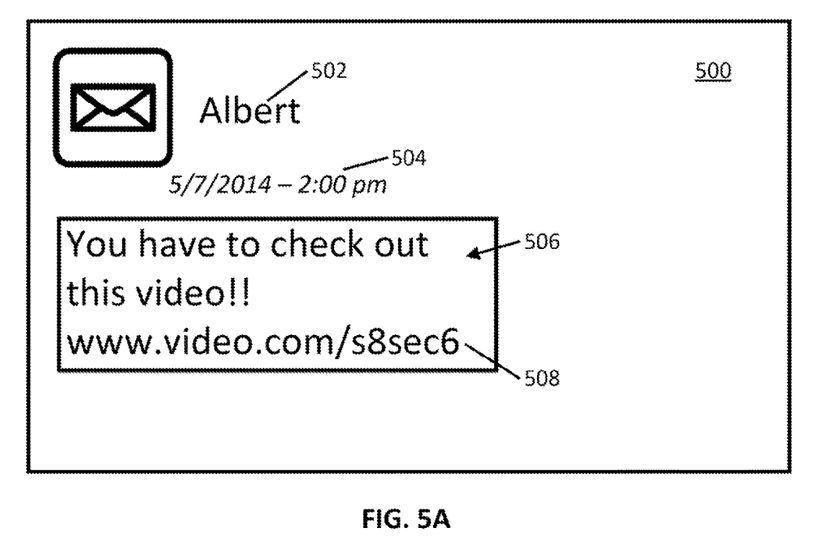
FIGS. 5A and 5B show examples of user interfaces for receiving a link to a video and presenting a suggestion to watch the video in accordance with some embodiments of the disclosed subject matter.

Process 400 can begin by receiving, on a user device, a message that includes a link to a video at 402. In some embodiments, the message can be any type of communication, such as a text message, an e-mail, a comment on a post on a social networking site, a chat message received through a messaging client, and/or any other suitable type of message. In some embodiments, the message can include any other content, such as text, images, icons, graphics, animations, and/or any other suitable type of content, for example, as shown in FIG. 5A.

Process 400 can determine if the link was selected on the user device at 404 using any suitable technique or combination of techniques. For example, in some embodiments, process 400 can determine if a web page corresponding to the link has been opened on the user device. As another example, in some embodiments, process 400 can determine if the received message was closed or dismissed without the link having been selected. In some embodiments, process 400 can determine if the link was selected and/or if the message was closed within a predetermined period of time (e.g., within two minutes of the message being received and/or opened, within ten minutes of the message being received and/or opened, within twenty minutes of the message being received and/or opened, and/or any other suitable period of time).

If, at 404, process 400 determines that the link has been selected ("Yes" at 404), process 400 can cause the video to be presented at 406. As described above in connection with FIG. 3, in some embodiments, the user device can request the video from media content server 102, which can cause the video to be transmitted to the user device. In some embodiments, the user device can then cause the video to be presented, for example, in a media player window. Note that, in some embodiments, the video can additionally or alternatively be presented on a user device other than the user device on which the message was received (e.g., on a television associated with the user device, and/or on any other suitable other user device).

If, at 404, process 400 determines that the link has not been selected ("No" at 404), process 400 can determine a probability value that indicates whether a user associated with the user device would be interested in viewing the video associated with the link at 408. As described above in connection with block 310 of FIG. 3, process 400 can request information relating to the user's preferences and the video from data server 104, and can use this information to determine the probability value. For example, if the received information indicates that the user has already viewed the video, process 400 can determine that there is a relatively lower probability that the user is interested in watching the video. As another example, if the received information indicates that the user has watched a video similar to the video associated with the link (e.g., created by the same entity, associated with similar metadata, and/or determined to be similar based on any other suitable information), process 400 can determine that there is a relatively higher probability that the user is interested in watching the video. As yet another example, if the received information indicates that the video has been watched by a connection (e.g., a friend on a social networking site) of the user, process 400 can determine that there is a relatively higher probability that the user is interested in watching the video. As still another example, if the received information indicates that the video is related to a topic known to be of interest to the user (e.g., based on posts on a social networking site, and/or based on any other suitable information), process 400 can determine that there is a relatively higher probability that the user is interested in watching the video.

In some embodiments, the probability value can be based on the popularity of the video associated with the link. For example, if the video is determined to have been viewed more than a predetermined number of times, process 400 can determine that there is a relatively higher probability that the user is interested in watching the video. As another example, if the video is determined to have been viewed more than a predetermined number of times by people in a demographic group associated with the user (e.g., people within the same age range, and/or any other suitable demographic group), process 400 can determine that there is a relatively higher probability that the user is interested in watching the video. As yet another example, if the video is determined to have been viewed by more than a predetermined number of connections of the user (e.g., from a social networking site), process 400 can determine that there is a relatively higher probability that the user is interested in watching the video. In some embodiments, information related to the popularity of the video can be received from data server 104.

In some embodiments, process 400 can determine the probability value based on the user's previous selections of links received from the contact associated with the message. For example, if process 400 determines that the user frequently (e.g., for more than 50% of received links, for more than 70% of received links, and/or for any other suitable percentage) selects links from the particular contact associated with the message, process 400 can determine that there is a relatively higher probability that the user is interested in watching the video.

In some embodiments, process 400 can determine the probability value using any suitable weighting of information. For example, in some embodiments, the probability value can be calculated using a higher weighting for information related to popularity of the video compared to information related to the user's interest in topics related to the video. Note that, in some embodiments, the weighting can be changed over time, for example, based on feedback from a user and/or from the user's actions. As a specific example, if an initial weighting uses a particular weights for multiple factors in calculating the probability value, and it is determined that the user rarely (e.g., less than 40% of the time, less than 20% of the time, and/or any other suitable percentage) selects a link in a suggestion to view the video, process 400 can adjust the weighting for any of the factors used in calculating the probability value. In some embodiments, a user can select and/or deselect particular types of information (e.g., information received from particular social networking sites, information related to a user's activity on particular media content hosting sites, and/or any other particular types of information) to be used in determining the probability value.

Process 400 can determine if the probability value exceeds a predetermined threshold (e.g., greater than 0.5, greater than 0.75, and/or greater than any other suitable threshold) at 410.

If, at 410, it is determined that the probability value does not exceed the predetermined threshold ("No" at 410), process 400 can terminate at 412.

If, at 410, it is determined that the probability value does exceed the predetermined threshold ("Yes" at 410), process 400 can determine a time the user is likely to want to watch the video at 414. As described above in connection with FIG. 3, in some embodiments, process 400 can determine the time based on a current activity associated with a user of the user device and/or a future activity associated with a user of the user device. For example, process 400 can determine that times during which a user is in a meeting are not times the user will be likely to watch the video. As another example, process 400 can determine that times during which the user is moving (e.g., walking, on public transit, in a car, etc.) are not times the user will be likely to watch the video. As yet another example, process 400 can determine that times during which the user is in a noisy environment (e.g., if an audio recording from a microphone associated with the user device exceeds a particular sound level) are not times the user will be likely to watch the video.

In some embodiments, process 400 can determine a time the user is likely to want to watch the video based on information associated with a status of the user device. For example, in some embodiments, the information associated with the status of the user device can include a remaining battery level associated with the device, a type of network connection (e.g., 3G, 4G, Wi-Fi, and/or any other suitable type of connection) currently being used on the device, whether the device is connected to headphones, and/or any other suitable status information. As a more particular example, in some embodiments, process 400 can determine that times when the battery level is below a predetermined threshold (e.g., below 50%, below 30%, and/or any other suitable threshold) are not times the user is likely to want to watch the video. As another more particular example, in some embodiments, process 400 can determine that times when a particular type of network connection is active on the user device are times the user is particularly likely to want to watch the video. As a specific example, process 400 can determine that the user is likely to want to watch the video if the user device is connected to a Wi-Fi network. As yet another example, in some embodiments, process 400 can determine that times when headphones are connected to the user device are times the user is likely to want to watch the video.

In some embodiments, process 400 can determine a time the user is likely to want to watch the video based on times and/or locations from which the user has previously watched videos. For example, in some embodiments, process 400 can determine that the user has watched videos while at a particular location (e.g., at home, at work, and/or any other suitable location) based on GPS information associated with the user device. In some such embodiments, process 400 can select a time when it is determined that the user is likely to be at that particular location. As another example, in some embodiments, process 400 can determine that the user has watched videos at a particular time of day and/or day of the week (e.g., on weekdays after 8 p.m., on weekdays before 8 a.m., on Saturdays, and/or any other particular time of day and/or day of the week). In some such embodiments, process 400 can select the particular time of day and/or day of the week.

In some embodiments, process 400 can use any suitable combination of information with any suitable weighting(s) to determine the time the user is likely to want to watch the video. Additionally, in some embodiments, the information used and/or the weighting(s) can be adjusted over time, for example, in response to feedback from the user and/or information relating to the user's actions in response to suggestions to view the video at the determined time. For example, if it is determined that the user rarely selects a link to view the video from the suggestion, process 400 can adjust the information used and/or the weighting of the information to determine times that the user more frequently selects the link from the suggestion.

Note that, in some embodiments, the determined time can be the current time. In some such embodiments, process 400 can be implemented such that process 400 waits at block 414 until the current time is determined to be one at which the user is likely to want to watch the video. Additionally or alternatively, in some embodiments, the determined time can be a time in the future (e.g., tonight at 7 p.m., in four hours, next Monday at 8 a.m., and/or any other suitable time in the future).

Process 400 can select a type of user interface to present a suggestion to watch the video at 416. For example, as described above in connection with block 318 of FIG. 3, in some embodiments, the type of user interface can include a text message, a user interface that includes other additional information (e.g., information about weather, traffic, etc.), an indication that the video has been added to a queue of videos in association with a video hosting service, and/or any other suitable type of user interface. In some embodiments, process 400 can select the type of user interface based on the probability value calculated at block 408. For example, in some embodiments, process 400 can select a particular type of user interface (e.g., a text message) if the probability value is greater than a predetermined threshold value (e.g., greater than 0.8), indicating that there is a relatively high likelihood the user will want to watch the video. As another example, in some embodiments, process 400 can select a different type of user interface (e.g., an indication that the video has been added to a queue) if the probability value is within a particular range (e.g., between 0.5 and 0.6, and/or any other suitable range).

Figure 5B:
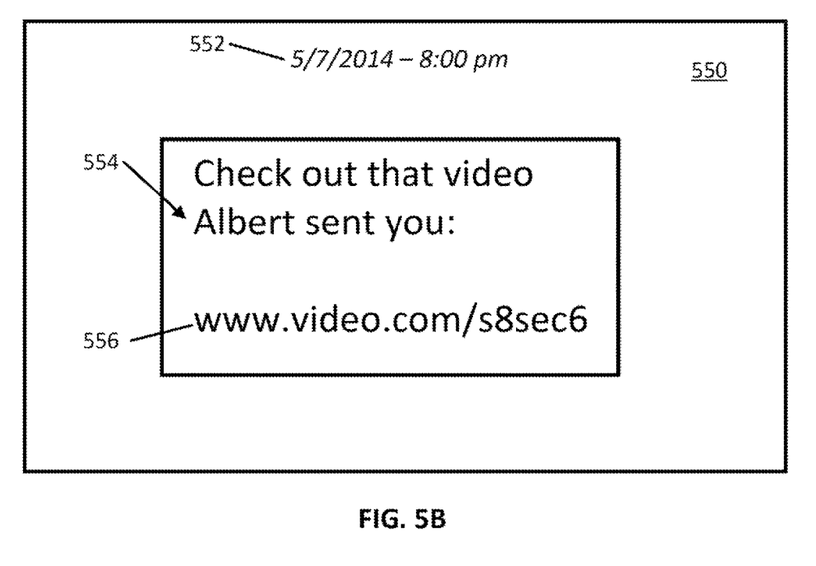

Process 400 can cause a suggestion to watch the video to be presented using the selected type of user interface at the determined time at 418. In some embodiments, the suggestion to watch the video can include the link to the video as well as any additional text, images, icons, animations, and/or any other suitable content, as shown in FIG. 5B.

Although not shown in FIG. 4, in some embodiments, process 400 can cause the video to begin being presented in response to determining that the suggestion and/or the suggestion interface has been selected. For example, in some embodiments, process 400 can open a media player and/or a browser window to begin playing the video. In instances where the suggestion indicates that the video has been added to a queue of videos, selection of the suggestion and/or the suggestion interface can cause a particular video in the queue (e.g., the video associated with the link, a first video in the queue, and/or any other suitable video in the queue) to begin being presented.

Additionally or alternatively, in some embodiments, process 400 can update information and/or techniques used to determine the probability that the user would be interested in viewing the video and/or the time the user is likely to want to watch the video in response to determining that the suggestion was not selected. For example, in some embodiments, process 400 can update the information and/or techniques in response to determining that the suggestion and/or the suggestion interface was dismissed, closed, and/or deleted. In some embodiments, process 400 can update the information by re-weighting factors used to determine the probability and/or the time. As a specific example, if the probability that the user would be interested in viewing the video was determined using information that the user had previously viewed related videos, process 400 can cause a weight associated with information relating to previously viewed related videos to be lowered. As another specific example, if the time the user is likely to want to watch the video was determined using information related to a current battery level of the user device, process 400 can cause a weight associated with information relating to the current battery level to be lowered.

Turning to FIG. 5A, an example 500 of a user interface for presenting a received message that includes a link to a video is shown in accordance with some embodiments of the disclosed subject matter. As illustrated, user interface 500 can include a sender name 502, a message timestamp 504, a message 506, and a link 508.

Sender name 502 can include an indication of an identity of the sender of message 506. For example, as shown in FIG. 5A, sender name 502 can include text that indicates the identity of the sender. In some embodiments, sender name 502 can include any suitable images, icons, graphics, animations, and/or any other suitable content. In some embodiments, sender name 502 can be omitted.

Message timestamp 504 can include any indication of a time that message 506 was received. For example, as shown in FIG. 5A, message timestamp 504 can include a date and/or a time of day. In some embodiments, message timestamp 504 can be omitted.

As described above in connection with FIGS. 3 and 4, message 506 can be a message of any communication type. In some embodiments, message 506 can include link 508 as well as any other suitable content, such as text, images, icons, graphics, animations, and/or any other suitable content. Link 508 can be a link to media content, such as a video. In some embodiments, link 508 can be a hyperlink to any suitable web site and/or media content hosting service. In some embodiments, link 508 can be hidden, and a particular image and/or word(s) of message 506 can be hyperlinked to the video.

Turning to FIG. 5B, an example 550 of a user interface for presenting a suggestion to watch the video associated with link 508 is shown in accordance with some embodiments of the disclosed subject matter. As illustrated, user interface 550 can include a suggestion timestamp 552 and suggestion interface 554.

Suggestion timestamp 552 can include any indication of a time that suggestion interface 554 is presented. For example, as shown in FIG. 5B, suggestion timestamp 552 can include a date and/or a time of day. In some embodiments, suggestion timestamp 552 can be omitted.

Suggestion interface 554 can include a suggestion to watch the video associated with link 508. In some embodiments, suggestion interface 554 can include link 556, which can indicate the link associated with the video. Additionally or alternatively, in some embodiments, text and/or an image included in suggestion interface 554 can by hyperlinked to the video.

It should be understood that at least some of the above described blocks of the processes of FIGS. 3 and 4 can be executed or performed in any order or sequence not limited to the order and sequence shown in and described in the figure. Also, some of the above blocks of the processes of FIGS. 3 and 4 can be executed or performed substantially simultaneously where appropriate or in parallel to reduce latency and processing times. Additionally or alternatively, some of the above described blocks of the processes of FIGS. 3 and 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting a suggestion to watch videos are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting a suggestion to watch videos, comprising:

receiving, on a computing device, a message in a communication interface for presentation on a display associated with the computing device, wherein the message was transmitted from another computing device and wherein the message includes a media identifier that, when selected, directs the computing device to retrieve a media content item from a content server and play back the media content item in a media application executing on the computing device;

determining that the media identifier was not selected within a particular time period from when the message was opened in the communication interface;

in response to determining that the media identifier was not selected within a particular time period from when the message was opened in the communication interface, retrieving timing information and location information associated with the computing device;

determining that the retrieved timing information and the retrieved location information correspond to one or more times and one or more locations at which the computing device has previously played back video content items; and causing a notification to be presented on the computing device, wherein a user selection of the notification causes the computing device to retrieve the media content item from the content server and initiate playback of the media content item in the media application executing on the computing device.

2. The method of claim 1, further comprising determining a level of interest for consuming the media content item at a later time based on content playback information from a user account associated with the computing device, wherein the timing information and the location information are retrieved in response to the level of interest being greater than a threshold level of interest.

3. The method of claim 2, wherein the content playback information from the user account associated with the computing device includes information indicating that the user consumed a second media content item related to the media content item, and wherein the level of interest is weighted based on the information indicating that the user consumed the second video content item related to the video content item.

4. The method of claim 1, further comprising determining a level of interest for consuming the media content and based on popularity information corresponding to the media content item, wherein the timing information and the location information are retrieved in response to the level of interest being greater than a threshold level of interest.

5. The method of claim 1, wherein determining that the media identifier was not selected within the particular time period from when the message was opened in the communication interface further comprises determining that the message has been closed within the particular time period.

6. The method of claim 1, wherein the notification includes an indication that a queue of a plurality of video content items including the video content item associated with the link has been created.

7. A system for presenting a suggestion to watch videos, the system comprising:
a hardware processor that is programmed to:
receive, on a computing device, a message in a communication interface for presentation on a display associated with the computing device, wherein the message was transmitted from another computing device and wherein the message includes a media identifier that, when selected, directs the computing device to retrieve a media content item from a content server and play back the media content item in a media application executing on the computing device;
determine that the media identifier was not selected within a particular time period from when the message was opened in the communication interface;
in response to determining that the media identifier was not selected within a particular time period from when the message was opened in the communication interface, retrieve timing information and location information associated with the computing device;
determine that the retrieved timing information and the retrieved location information correspond to one or more times and one or more locations at which the computing device has previously played back video content items; and
cause a notification to be presented on the computing device, wherein a user selection of the notification causes the computing device to retrieve the media content item from the content server and initiate playback of the media content item in the media application executing on the computing device.

8. The system of claim 7, wherein the hardware processor is further configured to determine a level of interest for consuming the media content item at a later time based on content playback information from a user account associated with the computing device, wherein the timing information and the location information are retrieved in response to the level of interest being greater than a threshold level of interest.

9. The system of claim 8, wherein the content playback information from the user account associated with the computing device includes information indicating that the user consumed a second media content item related to the media content item, and wherein the level of interest is weighted based on the information indicating that the user consumed the second video content item related to the video content item.

10. The system of claim 7, wherein the hardware processor is further configured to determine a level of interest for consuming the media content and based on popularity information corresponding to the media content item, wherein the timing information and the location information are retrieved in response to the level of interest being greater than a threshold level of interest.

11. The system of claim 7, wherein determining that the media identifier was not selected within the particular time period from when the message was opened in the communication interface further comprises determining that the message has been closed within the particular time period.

12. The system of claim 7, wherein the notification includes an indication that a queue of a plurality of video content items including the video content item associated with the link has been created.

13. A non-transitory computer-readable medium containing computer executable instructions that, when executed by a processor, cause the processor to perform a method for presenting a suggestion to watch videos, the method comprising:
receiving, on a computing device, a message in a communication interface for presentation on a display associated with the computing device, wherein the message was transmitted from another computing device and wherein the message includes a media identifier that, when selected, directs the computing device to retrieve a media content item from a content server and play back the media content item in a media application executing on the computing device;
determining that the media identifier was not selected within a particular time period from when the message was opened in the communication interface;
in response to determining that the media identifier was not selected within a particular time period from when the message was opened in the communication interface, retrieving timing information and location information associated with the computing device;
determining that the retrieved timing information and the retrieved location information correspond to one or more times and one or more locations at which the computing device has previously played back video content items; and
causing a notification to be presented on the computing device, wherein a user selection of the notification causes the computing device to retrieve the media content item from the content server and initiate playback of the media content item in the media application executing on the computing device.

14. The non-transitory computer-readable medium of claim 13, wherein the method further comprises determining a level of interest for consuming the media content item at a later time based on content playback information from a user account associated with the computing device, wherein the timing information and the location information are retrieved in response to the level of interest being greater than a threshold level of interest.

15. The non-transitory computer-readable medium of claim 14, wherein the content playback information from the user account associated with the computing device includes information indicating that the user consumed a second media content item related to the media content item, and wherein the level of interest is weighted based on the information indicating that the user consumed the second video content item related to the video content item.

16. The non-transitory computer-readable medium of claim 13, wherein the method further comprises determining a level of interest for consuming the media content and based on popularity information corresponding to the media content item, wherein the timing information and the location information are retrieved in response to the level of interest being greater than a threshold level of interest.

17. The non-transitory computer-readable medium of claim 13, wherein determining that the media identifier was not selected within the particular time period from when the message was opened in the communication interface further comprises determining that the message has been closed within the particular time period.

18. The non-transitory computer-readable medium of claim 13, wherein the notification includes an indication that a queue of a plurality of video content items including the video content item associated with the link has been created.

* * * * *